(12) United States Patent
Sinha et al.

(10) Patent No.: US 11,269,854 B2
(45) Date of Patent: Mar. 8, 2022

(54) PRODUCTION DATABASE UPDATE TOOL

(71) Applicant: Optum Technology, Inc., Eden Prairie, MN (US)

(72) Inventors: Prashant Kumar Sinha, Gaya (IN); Rajesh Kumar Agrawal, Haryana (IN)

(73) Assignee: Optum Technology, Inc., Eden Prairie, MN (US)

( * ) Notice: Subject to any disclaimer, the term of this patent is extended or adjusted under 35 U.S.C. 154(b) by 295 days.

(21) Appl. No.: 16/687,882

(22) Filed: Nov. 19, 2019

(65) Prior Publication Data
US 2021/0149873 A1 May 20, 2021
US 2021/0406244 A9 Dec. 30, 2021

(51) Int. Cl.
*G06F 16/23* (2019.01)
*G06F 16/2452* (2019.01)
*G06F 16/25* (2019.01)
*G06F 16/242* (2019.01)
*G06F 16/2453* (2019.01)

(52) U.S. Cl.
CPC ........ *G06F 16/2365* (2019.01); *G06F 16/242* (2019.01); *G06F 16/2453* (2019.01); *G06F 16/24524* (2019.01); *G06F 16/252* (2019.01)

(58) Field of Classification Search
CPC . G06F 16/2365; G06F 16/242; G06F 16/2453
See application file for complete search history.

(56) References Cited

U.S. PATENT DOCUMENTS

| | | | |
|---|---|---|---|
| 6,711,593 | B1 | 3/2004 | Gordon et al. |
| 8,103,626 | B2 | 1/2012 | Sykes et al. |
| 8,930,918 | B2 | 1/2015 | Tendulkar |
| 2007/0239751 | A1 | 10/2007 | Wei et al. |
| 2016/0004621 | A1 | 1/2016 | Gongloor et al. |
| 2017/0075954 | A1* | 3/2017 | Alpers ............... G06F 16/2453 |
| 2017/0329814 | A1* | 11/2017 | Shah .................. G06F 16/2379 |
| 2019/0147082 | A1* | 5/2019 | Cleaver .............. G06F 16/2452 707/779 |
| 2020/0089792 | A1* | 3/2020 | Packirisamy ....... G06F 16/2365 |
| 2021/0133178 | A1* | 5/2021 | Holmes ............... G06F 16/2365 |

OTHER PUBLICATIONS

Behara, "Continuous Integration with SQL Server Data Tools in Visual Studio 2017," SQL Shack, Jul. 17, 2017, 9 pp.

(Continued)

*Primary Examiner* — Grace Park
(74) *Attorney, Agent, or Firm* — Shumaker & Sieffert, P.A.

(57) ABSTRACT

A computing system may obtain code for a query to a database from a first user. In response, the application may automatically perform an operation to determine a number of records of the database that would be accessed by executing the query on the database. The computing system may output, for display to the first user, the number of records of the database that would be accessed by executing the query on the database. The computing system may output, for display to the first user, a prompt for an acknowledgement of the number of records of the database that would be accessed. In response to receiving an indication of the acknowledgement by the first user of the number of records of the database that would be accessed, the computing system may output, for display to a second user, the code for the query for review by the second user.

22 Claims, 12 Drawing Sheets

(56) References Cited

OTHER PUBLICATIONS

"Database Change Management: Achieving an Automated Approach and Version Control," Innovartis White paper, retrieved from http://www.innovartis.co.uk/Automated_Database_Change_Management_Whitepaper.htm on Jun. 27, 2019, 15 pp.

"EverSQL SQL Query Syntax Check & Validator," retrieved from https://www.eversql.com/sql-syntax-check-validator/ on Jun. 27, 2019, 2 pp.

"Rollbacks—SQL Change Automation 3—Product Documentation," red-gate.com, Apr. 12, 2019, 14 pp.

"Script Verification—SQL Change Automation 3—Product Documentation," red-gate.com, Mar. 21, 2019, 4 pp.

Peng et al., "Random Task Scheduling Scheme Based on Reinforcement Learning in Cloud Computing," Cluster Computing, vol. 18, No. 4, Sep. 2015, 14 pp.

Berral et al., "Adaptive Scheduling on Power-Aware Managed Data-Centers using Machine Learning," Proceedings of the 12th IEEE/ACM International Conference on Grid Computing 2011, Sep. 1, 2011, 11 pp.

* cited by examiner

SUBMISSION DETAILS

| | |
|---|---|
| REQUEST ID | 201 |
| APP NAME | APPNAME1 |
| TEAM NAME | TEAM1 |
| APPROVAL STATUS | PENDING REVIEW |
| SUBMITTED BY | JOHN DOE |
| AFFECTED RECORDS | 2 |
| APPROVED BY | -- |
| SUBMISSION DATE | 2019-03-01 |
| TICKET NUMBER | 1000001 |

| | |
|---|---|
| DATABASE URL | DATABASE.EXAMPLE.COM |
| DATABASE QUERY | {EXAMPLE QUERY CODE} |
| ROLLBACK QUERY | {EXAMPLE ROLLBACK CODE} |

APPROVE    REJECT

FIG. 4B

PRODUCTION DATABASE UPDATE TOOL

TECHNICAL FIELD

This disclosure generally relates to databases.

BACKGROUND

Production databases may include databases that store data that are used in day-to-day operations of organizations. For example, a production database may store data that describe statuses of orders received by an enterprise. In another example, a production database may store data describing policyholder accounts and insurance claims.

Because a production database may store data that are used in day-to-day operations of an organization, the production database may be critical to the mission of the organization. While it may be important to be able to make changes to the production database, it is also important to ensure that data in the production database is not lost or corrupted.

SUMMARY

In general, the disclosure describes techniques for improving operations of a database by filtering out queries that may impact the operation of the database (e.g., by reducing risks of improper queries being executed on databases). As described herein, a computing system may obtain code for a query to a database from a first user. In response, the computing system may automatically perform an operation to determine a number of records of the database that would be accessed by executing the query on the database. The computing system may output, for display to the first user, the number of records of the database that would be accessed by executing the query on the database. The computing system may output, for display to the first user, a prompt for an acknowledgement of the number of records of the database that would be accessed. In response to receiving an indication of the acknowledgement by the first user of the number of records of the database that would be accessed, the computing system may output, for display to a second user, the code for the query for review by the second user.

In one example, this disclosure describes a method comprising: obtaining, by processing circuitry of a computing device and from a first user, code for a query to a database, wherein the code for the query expresses an operation to be performed on the database in response to execution of the query; in response to receiving the code for the query, automatically performing, by the processing circuitry, an operation to determine a number of records of the database that would be accessed by executing the query on the database; outputting, by the processing circuitry and for display to the first user, the number of records of the database that would be accessed by executing the query on the database; outputting, by the processing circuitry and for display to the first user, a prompt for an acknowledgement by the first user of the number of records of the database that would be accessed; receiving, by the processing circuitry and from the first user, an indication of the acknowledgement by the first user of the number of records of the database that would be accessed; in response to receiving the code for the query and the indication of the acknowledgement by the first user of the number of records of the database that would be accessed, outputting, by the processing circuitry and for display to a second user, the code for the query for review by the second user; after outputting the code for the query for review by the second user, obtaining, by the processing circuitry and from the second user, an indication that the second user approves the code for the query; and based on the indication that the second user approves the code for the query, executing, by the processing circuitry, the query on the database.

In another example, this disclosure describes a computing system comprising processing circuitry and a storage system, the processing circuitry configured to: obtain, from a first user, code for a query to a database stored in the storage system, wherein the code for the query expresses an operation to be performed on the database; in response to receiving the code for the query, automatically perform an operation to determine a number of records of the database that would be accessed by executing the query on the database; output, for display to the first user, the number of records of the database that would be accessed by executing the query on the database; output, for display to the first user, a prompt for an acknowledgement by the first user of the number of records of the database that would be accessed; receive, from the first user, an indication of the acknowledgement by the first user of the number of records of the database that would be accessed; in response to receiving the code for the query and the indication of the acknowledgement by the first user of the number of records of the database that would be accessed, output, for display to a second user, the code for the query for review by the second user; after outputting the code for the query for review by the second user, obtain, from the second user, an indication that the second user approves the code for the query; and based on the indication that the second user approves the code for the query, execute the query on the database.

In another example, this disclosure describes a non-transitory, computer-readable medium comprising instructions that, when executed, are configured to cause processing circuitry of a computing device to: obtain, from a first user, code for a query to a database, wherein the code for the query expresses an operation to be performed on the database; in response to receiving the code for the query, automatically perform an operation to determine a number of records of the database that would be accessed by executing the query on the database; output, for display to the first user, the number of records of the database that would be accessed by executing the query on the database; output, for display to the first user, a prompt for an acknowledgement by the first user of the number of records of the database that would be accessed; receive, from the first user, an indication of the acknowledgement by the first user of the number of records of the database that would be accessed; in response to receiving the code for the query and the indication of the acknowledgement by the first user of the number of records of the database that would be accessed, output, for display to a second user, the code for the query for review by the second user; after outputting the code for the query for review by the second user, obtain, from the second user, an indication that the second user approves the code for the query; and based on the indication that the second user approves the code for the query, execute the query on the database.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 4B is a screen illustration of an example query approval confirmation interface, in accordance with one or more techniques of this disclosure.

Like reference characters refer to like elements throughout the figures and description.

DETAILED DESCRIPTION

Figure 1:
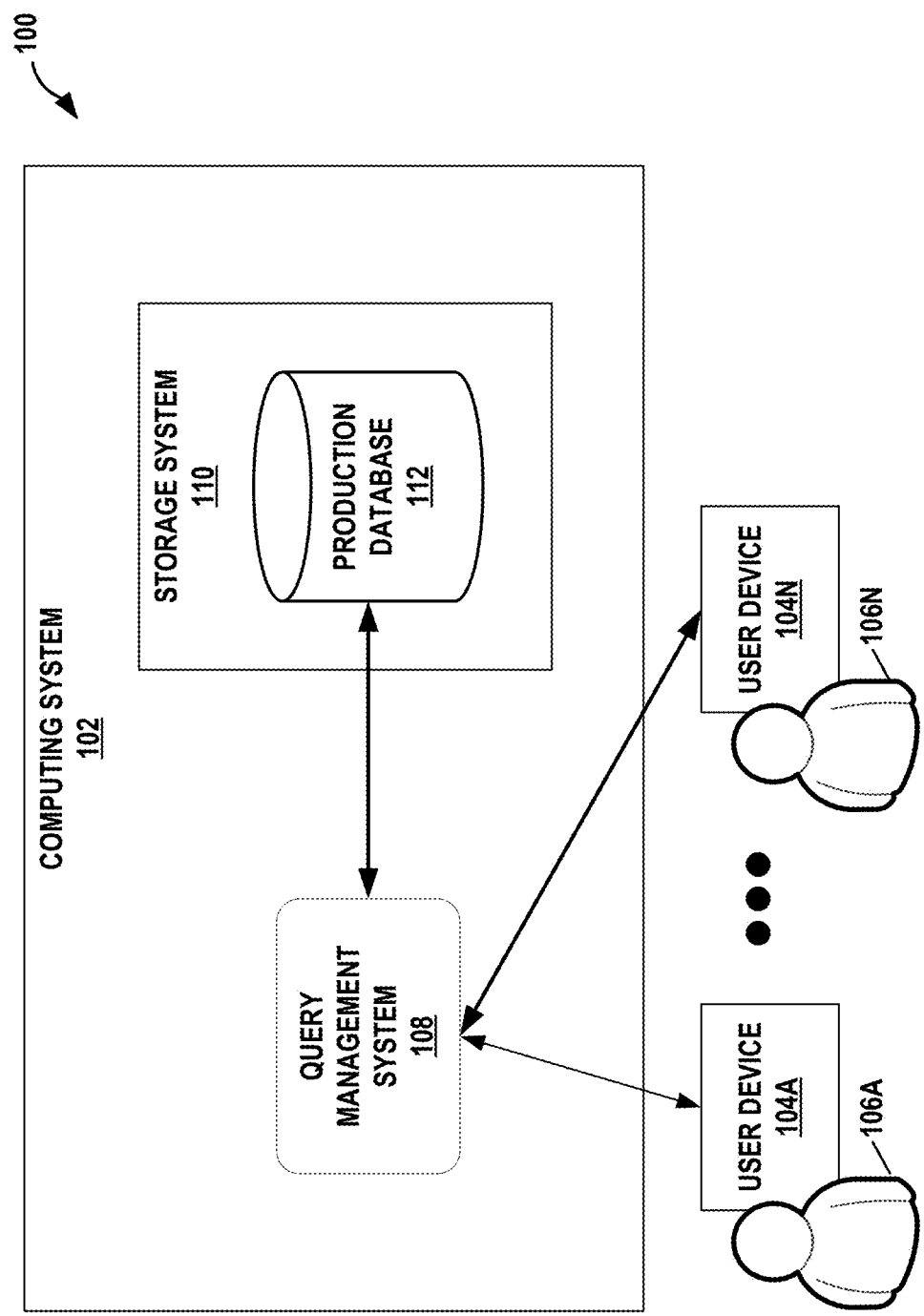
FIG. 1 is a conceptual diagram illustrating an example environment in which one or more techniques of this disclosure may be implemented.

Production databases are central to the operations of many types of organizations. For instance, a production database may be used in the day-to-day operations of an organization to store mission-critical data for an organization. Accordingly, data may be updated frequently in a production database. Because a production database may store mission-critical data, for proper operation of a database, it is important that queries that change data in the production database are correct and accomplish their intended purposes. An improper query, such as badly written query or a maliciously written query, can delete, overwrite, or move data in the production database in a manner that impacts access to the database, which may not be desired by the organization. For example, a minor typographical error in a query may result in the deletion of thousands of records in the production database instead of only a single record in the production database. In another example, seemingly minor defects in a query may result in the exfiltration of data from the production database, even if no data is changed in the production database.

Repairing damage caused by a badly written or maliciously written query may be extremely costly, both in terms of technical worker-hours and in terms of reputational damage. Likewise, it may be impossible to recover exfiltrated data. Furthermore, the occurrence of a data exfiltration event (e.g., a data breach) may result in significant legal damages.

This disclosure describes techniques that may reduce the risk of improper queries being executed against a production database. As described in one example of this disclosure, a query management system (QMS) executed by processing circuitry of a computing system may obtain, from a first user, code for a query to a database. Thus, discussion of activities performed by the QMS may in fact be performed by the processing circuitry. The code for the query expresses an operation to be performed on the database in response to execution of the query. In response to receiving the code for the query, the QMS automatically performs an operation to determine a number of records of the database that would be accessed (e.g., read, modified, deleted, etc.) by executing the query on the database. The QMS outputs, for display to the first user, the number of records of the database that would be accessed by executing the query on the database. Furthermore, in this example, the QMS outputs, for display to the first user, a prompt for an acknowledgement by the first user of the number of records of the database that would be accessed. The QMS may then receive, from the first user, an indication of the acknowledgement by the first user of the number of records of the database that would be accessed.

In this example, responsive to receiving the code for the query and the indication of the acknowledgement by the first user of the number of records of the database that would be accessed, the QMS may output, for display to a second user, the code for the query for review by the second user. After outputting the code for the query for review by the second user, the QMS may obtain, from the second user, an indication that the second user approves the code for the query. After receiving the indication that the second user approves the code for the query, the QMS may receive a request to execute the query on the database. In response to receiving the request to execute the query and based on the indication that the second user approved the code for the query, the QMS may execute the query on the database.

By informing the first user of the number of records of the database that would be accessed by executing the query, the QMS may alert the first user to the fact that execution of the query may result in more records being accessed than the first user may intend. Forcing the first user to acknowledge the number of records that would be accessed by executing the query may force the first user to consider whether the query is correct. The QMS enforces a requirement that two sets of eyes (i.e., the first user and the second user) review the query before the query is executed on the database. Furthermore, by informing the second user of the number of records of the database that would be accessed by executing the query, the QMS may alert the second, reviewing user that execution of the query may result in a suspicious number of records being accessed. For instance, if the second user observes that execution of the query may result in a suspicious number of records being accessed, the second user may be better positioned to investigate whether the query is malicious or contains errors.

FIG. 1 is a conceptual diagram illustrating an example environment 100 in which one or more techniques of this disclosure may be implemented. In the example of FIG. 1, environment 100 includes a computing system 102 and a set of user devices 104A through 104N (collectively, "user devices 104"). A set of users 106A through 106N (collectively, "users 106") may use user devices 104. In other examples, one or more of users 106 may directly use computing system 102 without involvement of a user device, such as any of user devices 104. In other examples that are in accordance with the techniques of this disclosure, environment 100 may include more, fewer, or different devices, components, or systems than shown in the example of FIG. 1.

Computing system 102 is a system that comprises one or more computing devices, each of which may include one or more processors. For instance, computing system 102 may include one or more mobile devices, server devices, personal computer devices, handheld devices, wireless routers, wireless communication hubs, special-purpose devices, and/or other types of devices. Actions described in this disclosure as being performed by computing system 102 may be performed by one or more of the computing devices of computing system 102, or more specifically, by processors of one or more of the computing devices of computing system 102. The processors may be implemented in circuitry.

Similarly, user devices 104 may include various types of computing devices that include processors. Example types of user devices 104 may include mobile devices, server devices, personal computer devices, handheld devices, wireless routers, wireless communication hubs, special-purpose devices, and/or other types of devices. User devices 104 may communicate with computing system 102 via one or more communication networks (not shown), such as local area networks, wide area networks, the Internet, and so on.

As shown in the example of the FIG. 1, computing system 102 implements a query management system (QMS) 108. For instance, one or more processors of one or more computing devices of computing system 102 may execute software instructions that cause computing system 102 to implement QMS 108. Furthermore, in the example of FIG. 1, a storage system 110 of computing system 102 may store a production database 112. Storage system 110 may comprise one or more storage devices, such as hard-disk drives, solid state memory devices, random access memory (RAM) modules, or other types of non-transitory computer-readable data storage media. Although the example of FIG. 1 only shows a single production database 112, in other examples, storage system 110 may store a plurality of databases.

Production database 112 may be implemented in one of a variety of ways. For example, production database 112 may be implemented at least in part as a relational database that comprises a set of tables. In some examples, production database 112 may be implemented at least in part using one or more Online Analytical Processing (OLAP) data cubes.

Production database 112 stores data in the form of records. In some examples where production database 112 is implemented using a set of tables, a record may be an individual row of one of the tables. In other examples where production database 112 is implemented using a set of tables, a record may be an individual cell in a table. In examples where production database 112 is implemented using an OLAP data cube, a record may be an individual cell in the OLAP data cube.

Production database 112 can be queried using queries that conform to a query language, such as Structured Query Language (SQL) or another type of query language. Although the term "query" appears to refer to simply a request to retrieve data from a database, a query may be used to read data from, move data within, delete data from, or otherwise access records in the database. In other words, a query may be used to access the database in a variety of ways, including reading, moving, and deleting data within the database.

QMS 108 may enable users 106 to define, create, maintain and control access to production database 112 and, in some examples, other databases. For instance, QMS 108 may execute queries on production database 112. Users 106 may use user devices 104 to submit queries to QMS 108 for execution on production database 112. In some examples, QMS 108 may interact with a web server (not shown in FIG. 1) that provides a web application for submitting queries, viewing queries results, and/or performing other activities that involve production database 112. In some examples, QMS 108 may implement, or interact with an application that implements, an Application Programming Interface (API) that includes functions for performing activities that involve production database 112.

As noted elsewhere in this disclosure, execution of improper queries, such as badly written or malicious queries, on production database 112 may have serious negative consequences on the operation and/or accessibility of database 112. For instance, execution of improper queries on production database 112 may cause data in production database 112 to be overwritten, deleted, improperly moved, or exfiltrated, each of which may result in disruption of operations of an organization that uses production database 112. For instance, in one example, a production database used by a health insurance provider may store data regarding the health insurance policies of subscribers. In this example, execution of a badly written or malicious query on production database 112 may result in subscribers or healthcare providers being unable to obtain reimbursement for healthcare services. In another example, an improper query may access so many records and/or perform an operation that is so complex that a performance and/or responsiveness level of computing system 102 is diminished.

Therefore, it may be important for the security and integrity of production database 112 to reduce the risk of improper queries (e.g., badly written queries or malicious queries) being executed on production database 112. In accordance with one or more techniques of this disclosure, QMS 108 may implement a set of processes that may help reduce the risk of improper queries being executed on production database 112 and/or help mitigate the impact of execution of an improper query being executed on production database 112. Thus, the techniques of this disclosure may improve the reliability and efficiency of computing system 102.

Figure 2:
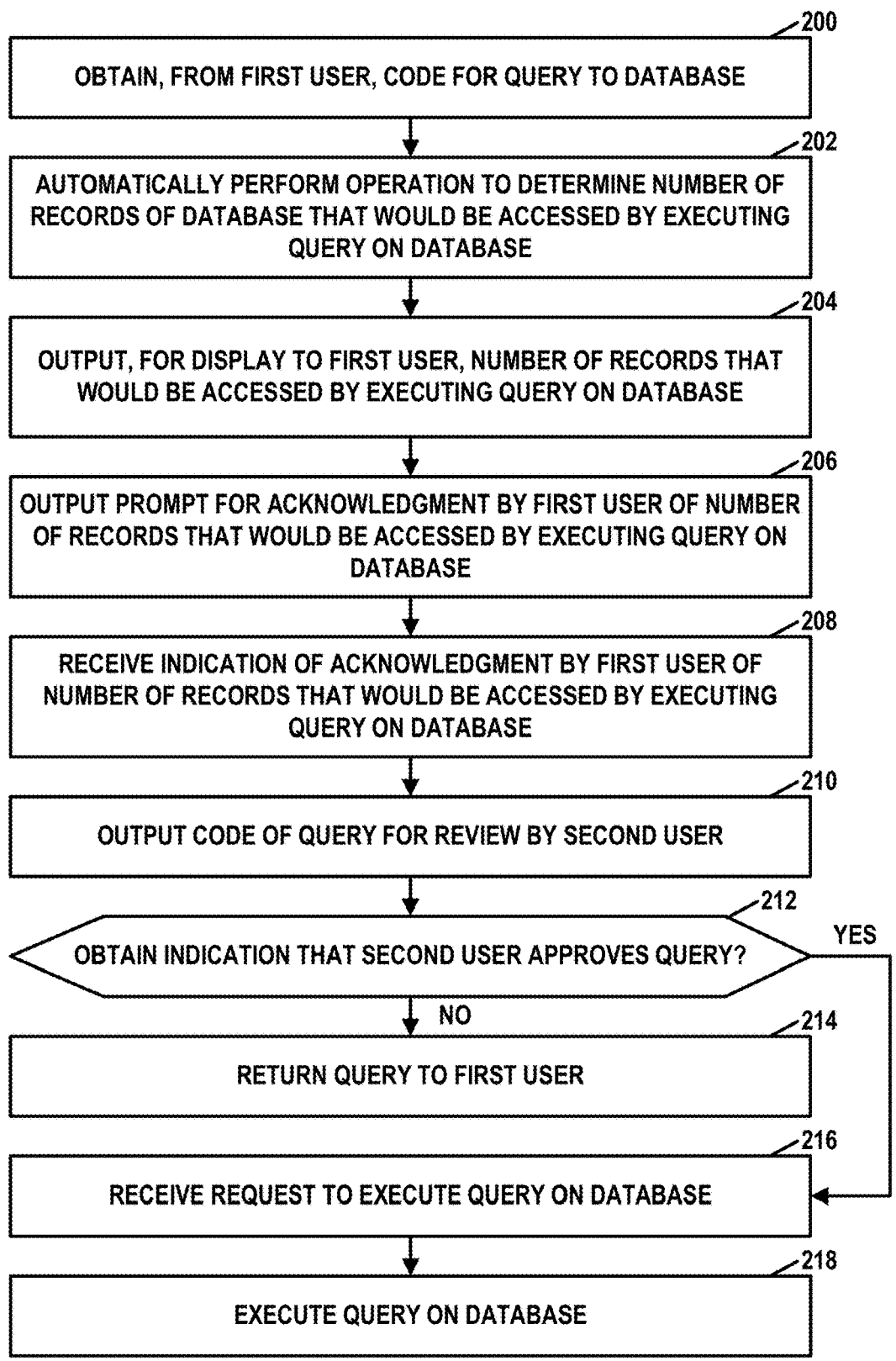
FIG. 2 is a flowchart illustrating an example operation that may help reduce the risk of improper queries being executed on a production database, in accordance with one or more techniques of this disclosure.

FIG. 2 is a flowchart illustrating an example operation that may help reduce the risk of improper queries being executed on production database 112, in accordance with one or more techniques of this disclosure. The flowchart of FIG. 2 is provided as an example. In other examples that are in accordance with the techniques of this disclosure, operations may include more, fewer, or different steps.

Figure 3A:
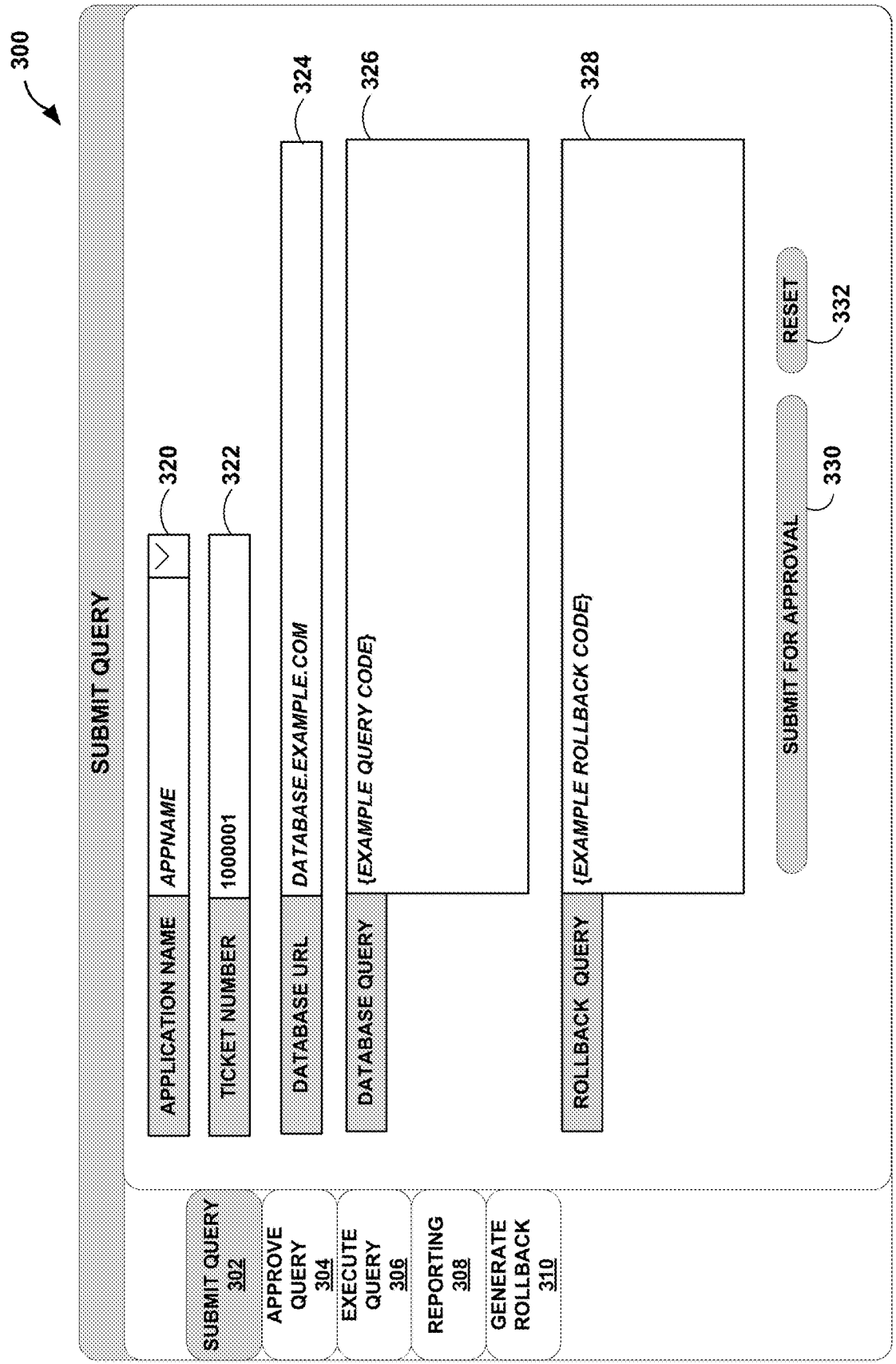
FIG. 3A is a screen illustration of an example query submission interface, in accordance with one or more techniques of this disclosure.

In the example of FIG. 2, QMS 108 may obtain, from a first user (e.g., user 106A), code for a query to a database, such as production database 112 (200). For ease of explanation, FIG. 2 is described with respect to production database 112. The code for the query expresses an operation to be performed on production database 112 in response to execution of the query. For instance, the code for the query may express an operation to update, delete, move, read, or otherwise access records in production database 112. The code for the query may be written in SQL or another query language. FIG. 3A, which is described in greater detail elsewhere in this disclosure, illustrates an example query submission interface that the first user may use to submit the query to QMS 108.

In some examples, QMS 108 may automatically validate a syntax of the code for the query and output, for display to the first user, an indication of whether the syntax of the code for the query is valid. In some examples, to help a reviewer efficiently review submitted queries, QMS 108 may validate the syntax of the code for the query prior to outputting, for display to the second user, the code for the query for review by the second user. In some examples, when QMS 108 outputs data or an interface for display, QMS 108 may interact with a web server or other type of application that sends data (e.g., webpage data) to user devices 104 that user devices 104 may use to present the data or interfaces. In other examples, when QMS 108 outputs data or an interface for display, the data or interface may be presented on a display screen connected to a computing device of computing system 102.

In response to receiving the code for the query, QMS 108 automatically performs an operation to determine a number of records of production database 112 that would be accessed (e.g., read, modified, deleted, etc.) by executing the query on production database 112 (202). QMS 108 may perform the operation to determine the number of records of production database 112 that would be accessed by executing the query on production database 112 by partially executing the query in a way that does not alter production database 112 or actually return data from production database 112.

As an example, the data in production database 112 may be stored in a form of a plurality of interconnected linked lists. The code of the query may indicate through which linked lists QMS 108 is to traverse to access, update, delete, etc. the data. In some examples, QMS 108 may count the links in the linked list to determine how many records would need to be accessed. As another example, the code for the query may identify a plurality of data that is to be accessed in a batch (e.g., all patients with particular insurance claim). In this example, QMS 108 may access metadata of data stored in the production database 112 that indicates whether the data is associated with a particular insurance claim. QMS 108 may maintain a counter that increments based on the information available from the metadata. There may be other ways in which QMS 108 may partially execute the query, and the above are just some non-limiting examples.

QMS 108 may output, for display to the first user, the number of records of production database 112 that would be accessed by executing the query on production database 112 (204). Although this disclosure describes QMS 108 as outputting data, such as the number of records of production database 112 that would be accessed by executing the query on production database 112, QMS 108 may, in some examples, interact with one or more other applications, such as a web server, to output data to users, such as the first user. QMS 108 interacting with these other applications is encompassed as part of the QMS 108 outputting data for display to a user.

Figure 3B:
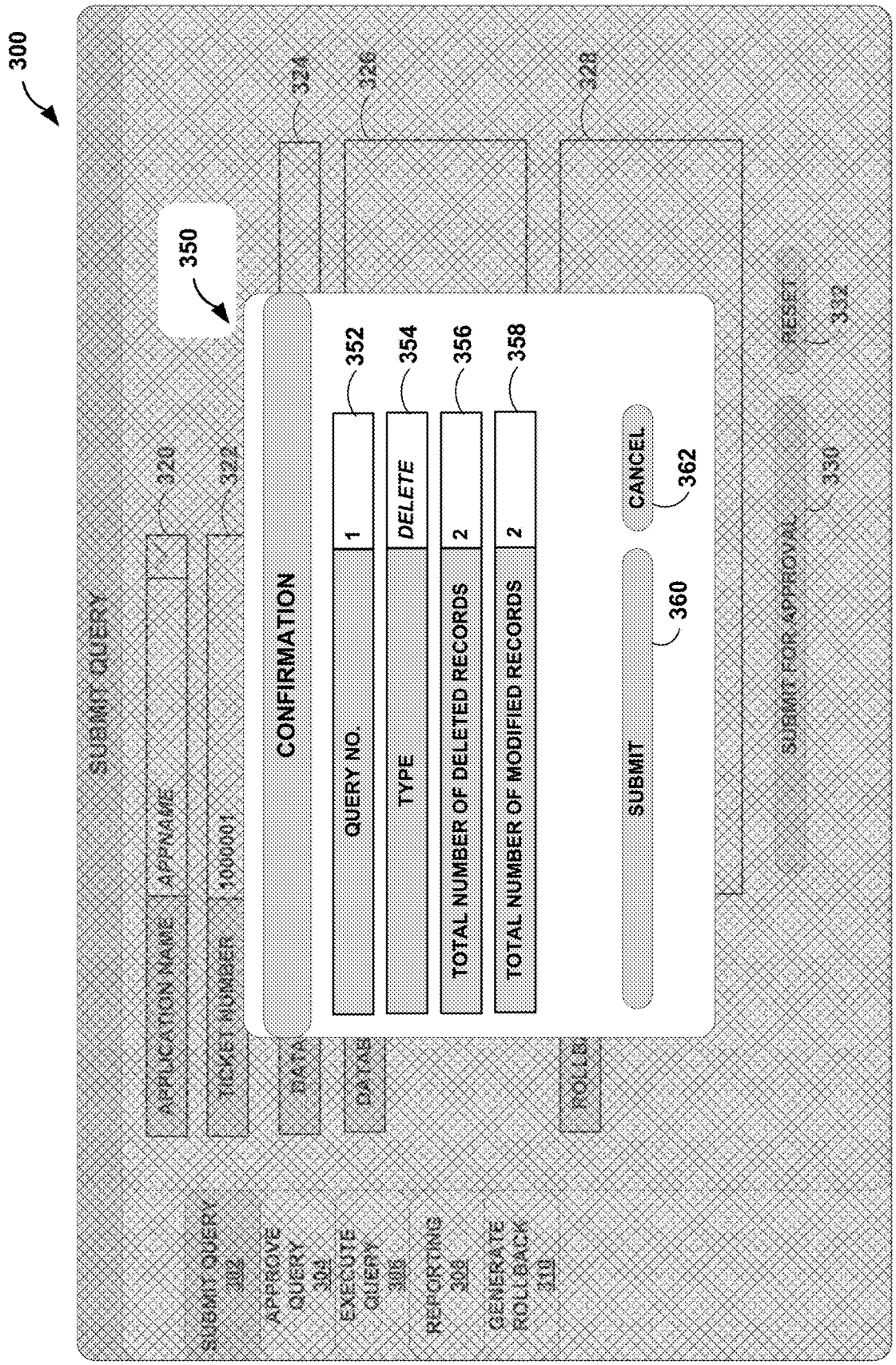
FIG. 3B is a screen illustration of an example query submission confirmation interface, in accordance with one or more techniques of this disclosure.

Furthermore, in the example of FIG. 2, QMS 108 outputs, for display to the first user, a prompt for an acknowledgement by the first user of the number of records of production database 112 that would be accessed by executing the query on production database 112 (206). FIG. 3B, which is described in greater detail elsewhere in this disclosure, is a screen illustration of an example query submission confirmation interface that includes an indication of the number of records of production database 112 that would be accessed by executing the query on production database 112.

In the example of FIG. 2, QMS 108 may then receive, from the first user, an indication of the acknowledgement by the first user of the number of records of production database 112 that would be accessed (208). For instance, QMS 108 may receive an indication that the first user selected a submit button of a query submission confirmation interface that includes an indication of the number of records of production database 112 that would be accessed by executing the query on production database 112. In some examples, QMS 108 may store a record, for purposes of later auditing changes to production database 112, indicating that the first user acknowledged the number of records of production database 112 that would be accessed if the query were executed on production database 112.

Additionally, in the example of FIG. 2, responsive to receiving the code for the query and the indication of the acknowledgment by the first user of the number of records of production database 112 that would be accessed by executing the query on production database 112, QMS 108 may output, for display to a second user (e.g., user 106N of FIG. 1), the code for the query for review by the second user (210). For example, QMS 108 may output a user interface for display that includes the code for the query. FIG. 4B, which is described in detail elsewhere in this disclosure, is a screen illustration of an example query approval confirmation interface that includes the code for the query. The first user is disallowed from submitting approval of one or more queries to production database 112 that the same first user submitted.

After outputting the code for the query for review by the second user, QMS 108 may obtain, from the second user, an indication of whether the second user approves the code for the query (212). For instance, QMS 108 may receive an indication of user input indicating that the second user selected an approve button or a reject button of a query approval confirmation interface.

In response to receiving an indication that the second user does not approve the code for the query ("NO" branch of 212), QMS 108 may return the query to the first user and does not add the query to a set of queries that are executable on the database (214). For instance, QMS 108 may send a notification message to the first user indicating that the code for the query was not approved.

Figure 5A:
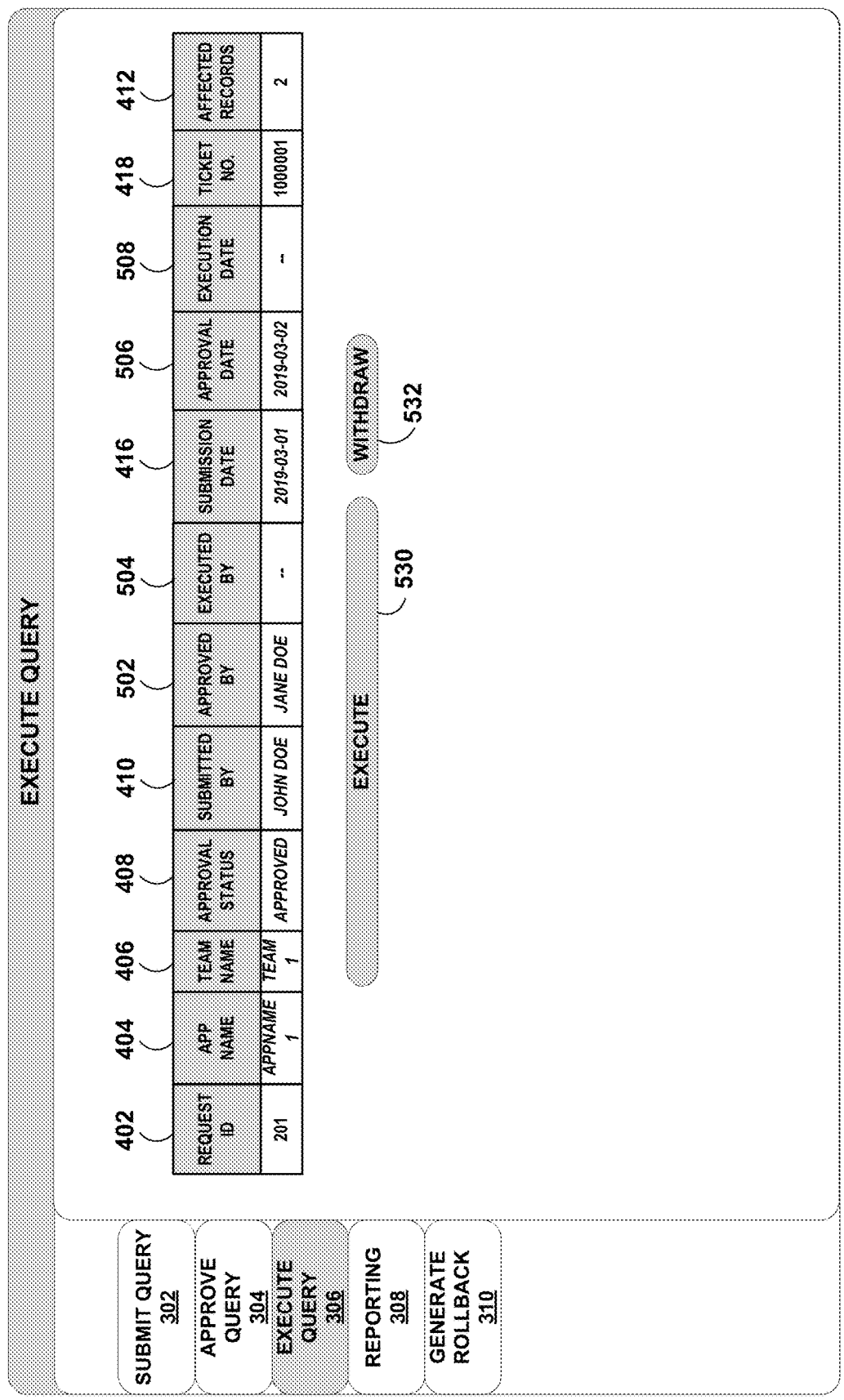
FIG. 5A is a screen illustration of an example query execution interface, in accordance with one or more techniques of this disclosure.

However, if QMS 108 received an indication that the second user approved the code for the query ("YES" branch of 212), QMS 108 may subsequently receive a request to execute the query on production database 112 (216). FIG. 5A, which is described in detail elsewhere in this disclosure, is a screen illustration of an example interface for requesting execution of a query. In some examples, QMS 108 may receive the request to execute the query on production database 112 from the first user (i.e., the user who submitted the query for review), by the second user, or by another user. In response to receiving the request to execute the query and based on the indication that the second user approved the code for the query, QMS 108 may execute the query on production database 112 (218). In some examples, QMS 108 may initiate execution of the query automatically in response to receiving an indication that the second user approved the query. In some examples, QMS 108 may notify the first user when the second user approves or rejects the query.

FIG. 3A is a screen illustration of an example query submission interface 300, in accordance with one or more techniques of this disclosure. In the example of FIG. 3A, query submission interface 300 includes a submit query tab 302, an approve query tab 304, an execute query tab 306, a reporting tab 308, and a generate rollback tab 310. Additionally, query submission interface 300 includes an application name box 320, a ticket number box 322, a database uniform resource locator (URL) box 324, a database query box 326, and a rollback query box 328. Query submission interface 300 also includes a submit for approval button 330 and a reset button 332.

Users may use submit query tab 302, approve query tab 304, execute query tab 306, reporting tab 308, and generate rollback tab 310 to navigate among user interfaces for different database-related activities. In the example of FIG. 3A, submit query tab 302 is shaded to indicate that the currently shown user interface (i.e., query submission interface 300) is associated with the submit query activity. In examples where the currently shown user interface is not associated with the submit query activity, QMS 108 may change the currently shown user interface to the user interface associated with the submit query activity (e.g., query submission interface 300) in response to receiving an indication of user input to select submit query tab 302. QMS 108 may change the currently shown interface to a user interface associated with query approvals (e.g., the user interface shown in the example of FIG. 4A) in response to receiving an indication of user input to select the approve query tab 304. QMS 108 may change the currently shown user interface to a user interface associated with executing queries (e.g., the user interface shown in the example of FIG. 5A) in response to receiving an indication of user input to select the execute query tab 306. QMS 108 may change the currently shown user interface to a user interface associated with a reporting activity (e.g., the user interface shown in the example of FIG. 6) in response to receiving an indication of user input to select the reporting tab 308. QMS 108 may change the currently shown user interface to a user interface associated with a generate rollback activity (e.g., the user interface shown in the example of FIG. 7) in response to receiving an indication of user input to select the generate rollback tab 310. The submit query tab 302, approve query tab 304, execute query tab 306, reporting tab 308, and generate rollback tab 310 serve the same functions in each of the user interfaces of FIGS. 3A, 3B, 4A, 4B, 5A, 5B, 5C, 6, and 7.

In some examples, specific users may not be able to use each of submit query tab 302, approve query tab 304, execute query tab 306, reporting tab 308, and generate rollback tab 310. For instance, a first user who submits a query might not be able to access a user interface associated with the approve query activity.

In the example of FIG. 3A, application name box 320 may accept user input or selection of an application name of an application. In the example of FIG. 3A, queries may be associated with specific applications. An application associated with the query may execute the query. Example types of applications may include web applications, ticket purchasing applications, insurance claim management applications, and so on. In some examples, multiple applications may execute queries on the same database (e.g., production database 112). Associating an application with a query in query submission interface 300 may preserve information about how changes were made to queries and the database.

Furthermore, in the example of FIG. 3A, ticket number box 322 may accept user input or selection of a ticket number. A ticket number may be generated (e.g., by a person or a technology support management system) in response to a request from a customer. For example, a customer may request a change or improvement to the functionality of an application. In another example, a customer may report that an application is not working properly. If a user may determine that submitting a new or edited query may help to resolve the request. Accordingly, the user may use query submission interface 300 to submit the query. The user may also input the associated ticket number in ticket number box 322 of query submission interface 300. QMS 108 may store data associating the ticket number with the submitted query. Subsequently, such data may be used to audit the sequence of events that led up to the submission of the query.

Database URL box 324 may accept user input or selection of a URL of a database on which a query is to be executed. For instance, database URL box 324 may accept user input or selection of a URL of production database 112. Database query box 326 may accept user input of the code of a query to be executed on the database indicated by the URL entered in database URL box 324.

Rollback query box 328 may accept user input of code of a rollback query. The rollback query is a query that rolls back one or more changes to the database caused by the query entered in database query box 326. In accordance with some techniques of this disclosure, it may be a requirement that the user provide the rollback query at the time of submission of the query entered in database query box 326. Thus, the rollback query may be immediately available for use in rolling back changes to the database that were caused by the query if the query turns out to be improper. As described in detail elsewhere in this disclosure, the user may use a user interface associated with the generate rollback activity to generate the rollback query.

In the example of FIG. 3A, QMS 108 may obtain the code for the query when the user selects the submit for approval button 330. QMS 108 may reset one or more boxes of query submission interface 300 in response to receiving an indication of user selection of reset button 332.

In some examples where a first query (e.g., a query entered in query box 326) expresses a first operation to be performed on production database 112 and the first operation is configured to alter at least one record stored by production database 112 from a first state to a second state, QMS 108 may, prior to outputting the code for the first query for review by the second user, output to the first user, a prompt for a second query for rolling back changes to production database 112 caused by execution of the first query. The second query may express a second operation to be performed on production database 112. The second operation is configured to revert the at least one record from the second state back to the first state. In this example, QMS 108 may receive, from the first user, the second code for rolling back changes to the database caused by execution of the first code.

FIG. 3B is a screen illustration of an example query submission confirmation interface 350, in accordance with one or more techniques of this disclosure. QMS 108 may output query submission confirmation interface 350 for display in response to obtaining code for a query to a database (e.g., production database 112). For instance, QMS 108 may output query submission confirmation interface 350 for display in response to receiving an indication of user selection of the submit for approval button 330 of query submission interface 300 (FIG. 3A).

As shown in the example of FIG. 3B, query submission confirmation interface 350 includes a query number box 352, a query type box 354, a total number of deleted records box 356, and a total number of modified records box 358. Query submission confirmation interface 350 also includes a submit button 360 and a cancel button 362.

The query number box 352 indicates a number of queries that are to be executed as a package. That is, in some examples, QMS 108 may receive a compound query that includes two or more separate queries that are to be executed in sequence. For instance, one of the queries may be read data from a set of records and a second one of the queries may be to modify one of those records. Type box 354 indicates types of the queries. Example types of queries may be read queries, delete queries, modify queries, and so on.

The total number of deleted records box 356 indicates a number records that would be deleted by executing the query on the database. The total number of modified records box 358 indicates a number of records that would be modified by executing the query on the database. Thus, query submission confirmation interface 350 may serve as a prompt for an acknowledgement by the user of the number of records of the database that would be accessed (e.g., deleted or modified) by executing the query on the database. QMS 108 may receive an indication of an acknowledgement by the first user of the number of records of the database that would be accessed when QMS 108 receives an indication of user selection of submit button 360. QMS 108 may close query submission confirmation interface 350 without submitting the query for approval in response to receiving an indication of user selection of cancel button 362.

Figure 4A:
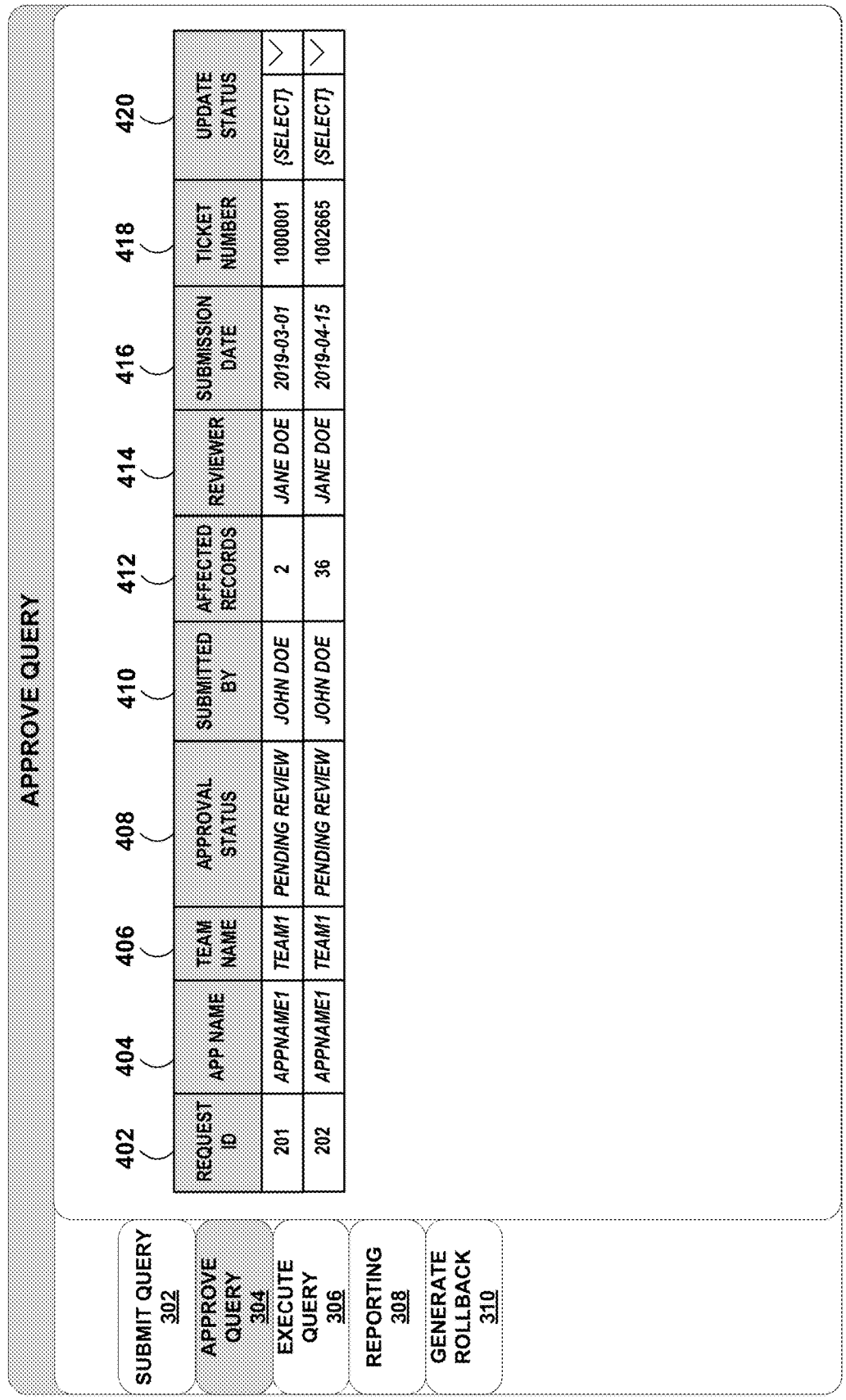
FIG. 4A is a screen illustration of an example query approval interface, in accordance with one or more techniques of this disclosure.

FIG. 4A is a screen illustration of an example query approval interface 400, in accordance with one or more techniques of this disclosure. Query approval interface 400 allows a user to review a set of queries that are pending approval. In the example of FIG. 4A, query approval interface 400 includes submit query tab 302, approve query tab 304, execute query tab 306, reporting tab 308, and generate rollback tab 310. Additionally, query approval interface 400 includes a table having a request ID column 402, an application (app) name column 404, a team name column 406, an approval status column 408, a submitted by column 410, an affected records column 412, a reviewer column 414, a submission date column 416, a ticket number column 418, and an update status column 420. Each row of the table corresponds to a different query that is pending approval. App name column 404 indicates a name of an application associated with the query. Team name column 406 indicates a name of a team that supports the application associated with the query. Approval status column 408 indicates an approval status of a query. Submitted by column 410 indicates a name of a person who submitted the query for approval. Affected records column 412 may indicate a number of records that would be accessed if the query were executed on the database. Reviewer column 414 may specify a person who is to review the query. Submission date column 416 may specify a date on which the query was submitted for review. Ticket number column 418 may specify a ticket number associated with the query. Update status column 420 may include options for updating a status of a query. For instance, update status column 420 may include options to approve a query, reject the query, or mark the query as under review.

FIG. 4B is a screen illustration of an example query approval confirmation interface 450, in accordance with one or more techniques of this disclosure. QMS 108 may output query approval confirmation interface 450 for display in response to receiving an indication of user input to update the status of a query in query approval interface 400. In the example of FIG. 4B, query approval confirmation interface 450 includes boxes for the data for the query from columns 402, 404, 406, 408, 410, 412, 414, 416, and 418 of query approval interface 400. Additionally, in the example of FIG. 4B, query approval confirmation interface 450 includes a database URL box 454, a database query box 456, and a rollback query box 458. Database URL box 454 includes text indicating a URL of a database on which the query is to be executed. Database query box 456 includes code of one or more queries. Rollback query box 458 includes code for one or more rollback queries designed to roll back the one or more queries indicated in database query box 456. In the example of FIG. 4B, QMS 108 may receive an indication of whether a user approves the query by receiving an indication of user selection of an approve button 460 or a reject button 462.

FIG. 5A is a screen illustration of an example query execution interface 500, in accordance with one or more techniques of this disclosure. Query execution interface 500 includes a table having the request ID column 402, app name column 404, team name column 406, approval status column 408, submitted by column 410, effected records column 412, submission date column 416, and ticket number column 418. The data for a query in these columns may be the same as data for the query in corresponding columns of query approval interface 400. Additionally, the table in query execution interface 500 includes an approved by column 502, an executed by column 504, an approval date column 506, and an execution data column 508. The approved by column 502 may indicate a name of a user that approved the query. The executed by column 504 may indicate a name of a user that initiated execution of the query. The approval date column 506 indicates a date of approval of the query. The execution date column 508 indicates a date on which the query was executed. The query does not appear in query execution interface 500 unless the query has previously been approved.

Furthermore, in the example of FIG. 5A, query execution interface 500 includes an execute button 530 and a withdraw button 532. QMS 108 may receive a request to execute the query on the database when QMS 108 receives an indication of user selection of execute button 530. QMS 108 may withdraw the query from a set of executable queries in response to receiving an indication of user selection of withdraw button 532.

Figure 5B:
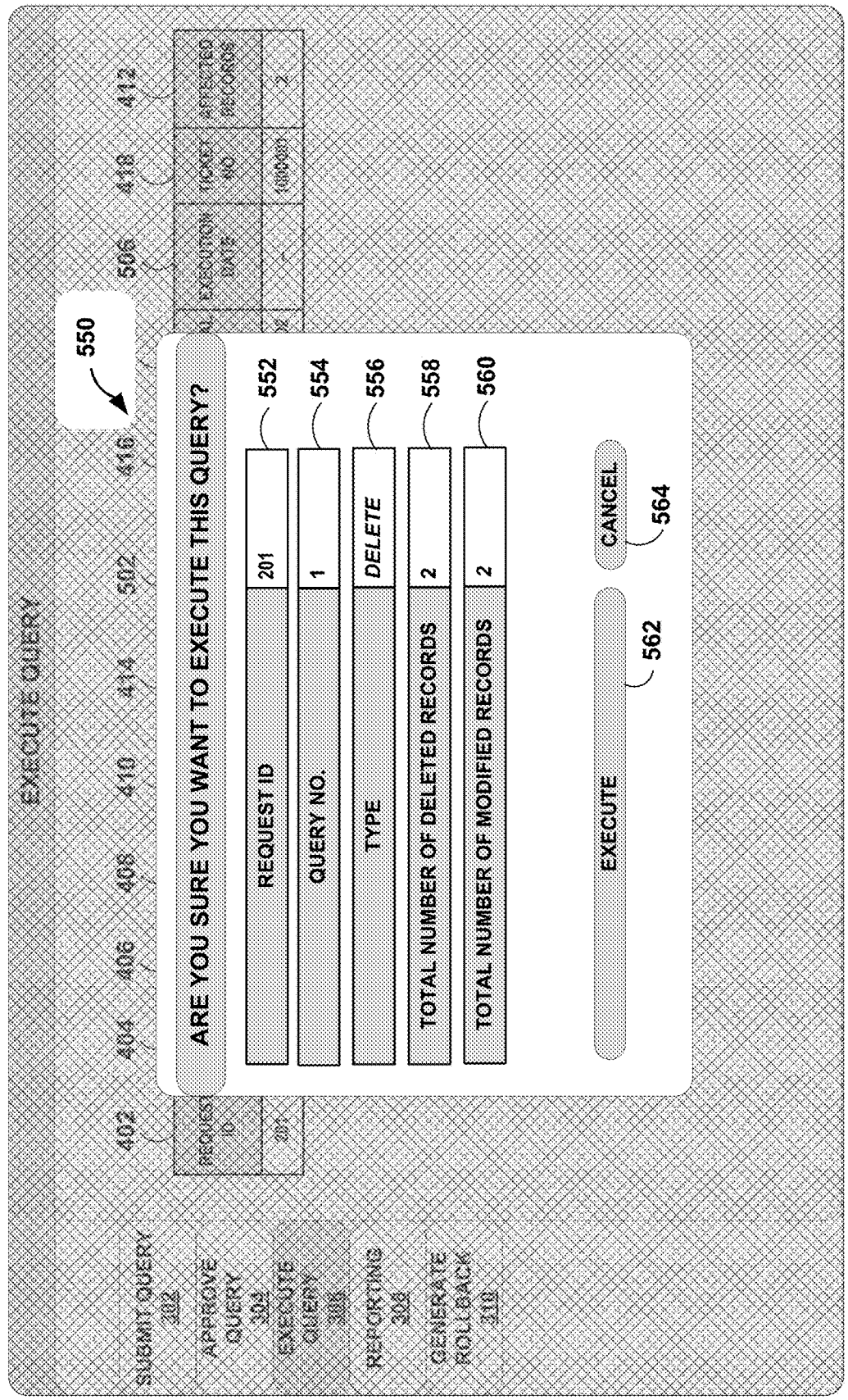
FIG. 5B is a screen illustration of an example query execution confirmation interface, in accordance with one or more techniques of this disclosure.

FIG. 5B is a screen illustration of an example query execution confirmation interface 550, in accordance with one or more techniques of this disclosure. QMS 108 may output query execution confirmation interface 550 in response to receiving an indication of user input to execute a query (e.g., in response to receiving an indication of user input to select execute button 530 of query execution interface 500). In the example of FIG. 5B, query execution confirmation interface 550 includes a request ID box 552, a query number box 554, a query type box 556, a total number of deleted records box 558, and a total number of modified records box 560. Query number box 554, query type box 556, total number of deleted records box 558, and total number of modified records box 560 may include the same data for the query as query number box 352, query type box 354, total number of deleted records box 356, and total number of modified records box 358 of FIG. 3B. In the example of FIG. 5B, QMS 108 may execute the query in response to receiving an indication of user input to select execute button 562. QMS 108 may cancel execution of the query in response to receiving an indication of user input to select cancel button 564.

Figure 5C:
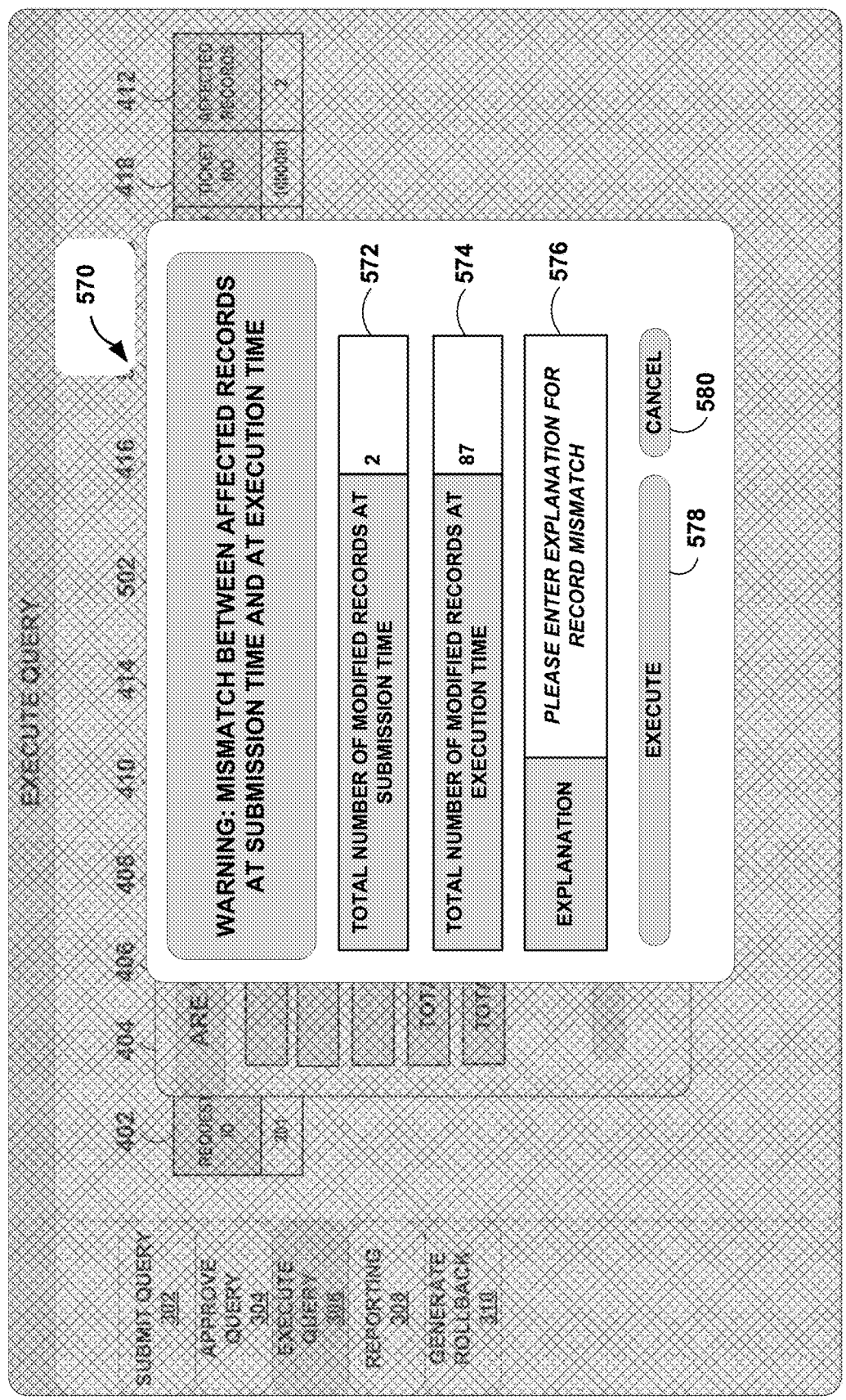
FIG. 5C is a screen illustration of an example mismatch warning interface, in accordance with one or more techniques of this disclosure.

FIG. 5C is a screen illustration of an example mismatch warning interface 570, in accordance with one or more techniques of this disclosure. In response to receiving a request to initiate execution of an approved query, QMS 108 may determine the number of records that will be accessed when the query is executed on the database. QMS 108 may then determine whether this number of accessed records matches the number of accessed records determined for the query when the query was submitted for review and approval. QMS 108 may output mismatch warning interface 570 in response to determining that there is a mismatch between these two numbers of accessed records.

Specifically, in the example of FIG. 5C, mismatch warning interface 570 includes a box 572, a box 574, an explanation box 576, an execute button 578, and a cancel button 580. Box 572 indicates the number of records that would be accessed (e.g., modified) by executing the query, as determined at the time of submission of the query for approval. Box 574 indicates the number of records that would be accessed (e.g., modified) by executing the query, as determined at the time of the request to execute the query. Explanation box 576 allows the user to input an explanation for the mismatch between these two numbers. In some examples, the user is required to provide such an explanation before QMS 108 executes the query. Forcing the user to provide such an explanation may provide a further point on which to halt execution of improper queries. Additionally, the explanation may serve as audit data that may be used to understand why an improper query was executed on the database. In the example of FIG. 5C, QMS 108 may execute the query in response to receiving an indication of user input to select execute button 578. QMS 108 may cancel execution of the query in response to receiving an indication of user input to select cancel button 580.

Thus, in some examples of this disclosure, the operation, that is performed when the query is submitted for approval, to determine the number of records of the database that would be accessed by executing the query on the database may be a first operation to determine a first number of records of the database that would be accessed by executing the query on the database. In response to receiving the request to execute the query and prior to executing the query on the database, QMS 108 may automatically perform a second operation to determine a second number of records of the database that would be accessed by executing the query on the database. QMS 108 may then output, for display, the second number of records of the database that would be accessed by executing the query on the database.

With respect to the example of FIG. 5C, prior to executing the query on the database, QMS 108 may determine that the second number of records of the database that would be accessed by executing the query on the database is different from the first number of records of the database that would be accessed by executing the query on the database. Accordingly, QMS 108 may output, for display, an indication (e.g., mismatch warning interface 570) that the second number of records is different from the first number of records and a prompt for an explanation of why the second number of records is different from the first number of records. QMS 108 may receive, (e.g., from a user) data indicating the explanation of why the second number of records is different from the first number of records. Additionally, QMS 108 may store the data indicating the explanation of why the second number of records is different from the first number of records. In response to receiving the request to execute the query and the data indicating the explanation of why the second number of records is different from the first number of records, and based on the indication that a second user approves the code for the query, QMS 108 may execute the query on the database.

Figure 6:
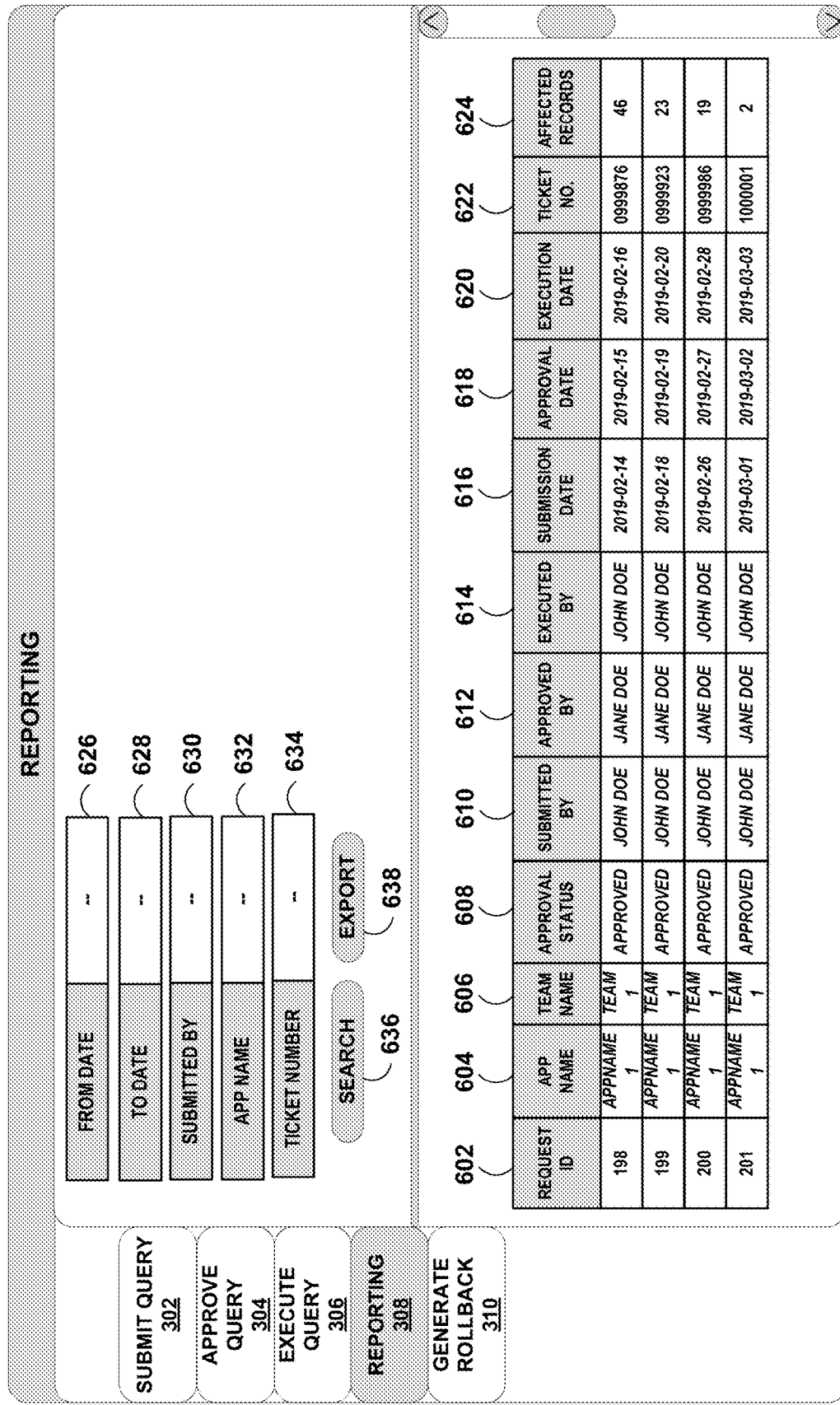
FIG. 6 is a screen illustration of an example reporting interface, in accordance with one or more techniques of this disclosure.

FIG. 6 is a screen illustration of an example reporting interface 600, in accordance with one or more techniques of this disclosure. QMS 108 may provide a list of executed queries and tools for searching for executed queries. As shown in the example of FIG. 6, reporting interface 600 includes a table having a request ID column 602, an application name column 604, a team name column 606, an approval status column 608, a submitted by column 610, an approved by column 612, an executed by column 614, a submission date column 616, an approval date column 618, an execution date column 620, a ticket number column 622, and an affected records column 624. Data in each of these columns may have the same meanings as data in similarly named columns of tables in other user interfaces described in this disclosure.

Additionally, reporting interface 600 includes a "from date" search box 626, a "to date" search box 628, a submitted by search box 630, an application (app) search box 632, and a ticket number search box 634. Reporting interface 600 also includes a search button 636 and an export button 638. A user may enter search criteria in one or more of "from date" search box 626, "to date" search box 628, submitted by search box 630, application search box 632, or ticket number search box 634. QMS 108 may execute a search for applicable queries based on the search criteria in response to receiving an indication of user input to select search button 636. QMS 108 may export a table of queries (e.g., one or more rows of the table shown in reporting interface 600) to a spreadsheet file in response to receiving an indication of user input to select export button 638.

In some examples, different types of users may only be able to see data regarding specific types of queries in reporting interface 600. For example, users having an administrator role may be able to see data regarding any queries in reporting interface 600. A user having an approver role may only be able to see data regarding queries approved or submitted by the user. A user having a normal user role may only be able to see data regarding queries submitted by the user.

Figure 7:
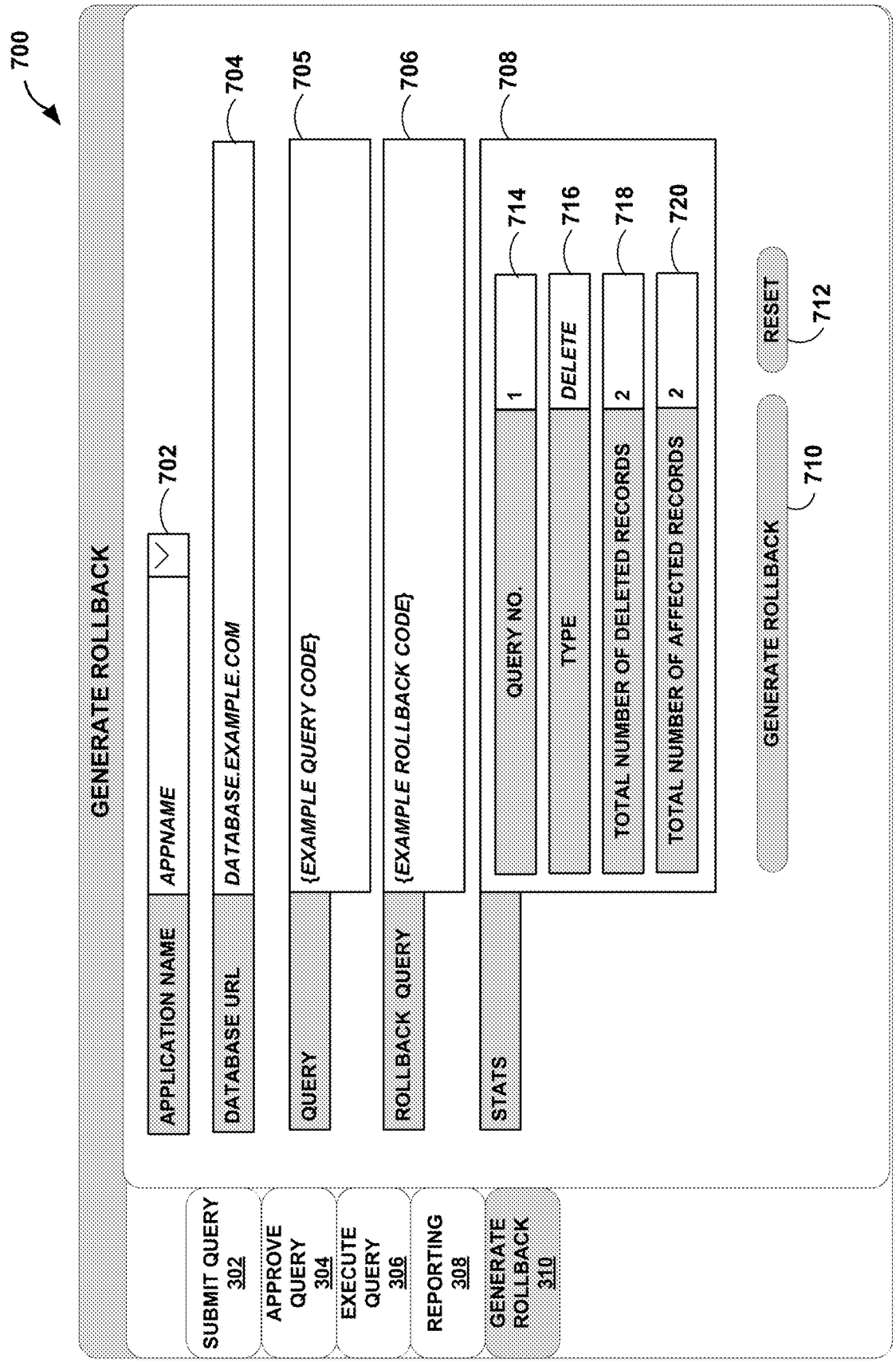
FIG. 7 is a screen illustration of an example rollback interface, in accordance with one or more techniques of this disclosure.

FIG. 7 is a screen illustration of an example rollback interface 700, in accordance with one or more techniques of this disclosure. A user may use rollback interface 700 to generate a rollback query that rolls back changes to the database made by executing a query on the database. In the example of FIG. 7, rollback interface 700 includes an application name box 702, a database URL box 704, a query box 705, a rollback query box 706, a set of statistical data boxes 708, a generate rollback button 710, and a reset button 712. Statistical data boxes 708 includes a query number box 714, a query type box 716, a total number of deleted records box 718, and a total number of affected records box 720. Application name box 702 may indicate a name of an application associated with the query. Database URL box 704 indicates a URL of a database against which the query will be executed.

Rollback query box 706 contains code of the rollback query. In some examples, a user 106 generates the rollback query and populates rollback query box 706 with the code of the rollback query. In some examples, user 106 may provide the code for the rollback query in the form of an input file. As an example, rollback interface 700 may provide a directory navigation interface that user 106 may use to upload the input file containing the code for the rollback query. In other examples, rollback interface 700 implements copy, paste, and cut commands that allows user 106 to "paste" the code for the rollback query into rollback query box 706.

In other examples, and as described in more detail below, QMS 108 may populate the code of the rollback query into rollback query box 706 in response to receiving an indication of user input to select generate rollback button 710.

QMS 108 may reset the boxes of rollback interface 700 in response to receiving an indication of user input to select reset button 712.

To populate the code of the rollback query into rollback query box 706, QMS 108 processes the code for the query to automatically generate the code for the rollback query. In some examples, the Java programming language may be used to implement the portions of QMS 108 that process the code for the query to automatically generate the code for the rollback query. For example, QMS 108 identifies a type of the query specified by the code for the query. In examples where production database 112 is a SQL database, user 106 typically may provide only three types of queries for execution by QMS 108: INSERT, DELETE, and UPDATE. User 106 may use the INSERT query to insert new records in database tables of production database 112. User 106 may use the DELETE query to delete records from database tables of production database 112. User 106 may use the UPDATE query to update or change information of an existing record or records in database tables of production database 112. After identifying the type of the query specified by the code for the query, QMS 108 processes the code of the rollback query to generate the code of the rollback query, e.g., code that is specifically tailored to roll back the query supplied by user 106.

In one example, QMS 108 identifies the code for the query as an INSERT type. QMS 108 identifies a table name specified by the code for the query. As an example, the code for the query is "INSERT into Table-1 [9999][data to be inserted]". In this example, the specified table name is "Table-1." QMS 108 retrieves table definition information from a database data dictionary of production database 112. Most databases (including Oracle, DB2, SQL Server, etc.) keep table definition data in the database data dictionary. QMS 108 retrieves a field name of a table identified as a "Primary Key" from the database data dictionary. The "Primary Key" is a field of a database table that is unique to each record inserted or maintained within the database table. Using the "Primary Key" for the table and the value for the field specified by the code for the query provided by user 106, QMS 108 generates a "where clause" of a rollback query. With respect to the foregoing example, QMS 108 determines that the Primary Key specifies "ID" and the value for the field specified by the code for the query is "9999," such that the "where" clause is "where ID=9999." Further, QMS 108 generates a prefix DELETE statement and table name for the generated "where clause" to create a completed DELETE query configured to delete the record specified by the code for the query provided by user 106. With respect to the foregoing example, the completed DELETE query would be "DELETE from Table-1 where ID=9999." Thus, as detailed above, where the query specified by user 106 is an INSERT query to add a specific record, QMS 108 generates a DELETE query that removes the specified record. Thus, the completed DELETE query is the code of the rollback query that rolls back the INSERT query specified by the code for the query provided by user 106.

As another example, QMS 108 identifies the code for the query as an DELETE type. As an example, the code for the query is "DELETE from Table-1 [9999][data to be deleted]". QMS 108 identifies details specified by the code for the query as described above. For example, QMS 108 identifies a table name specified by the code for the query. As an example, a table name specified by the code for the query is "Table-1." QMS 108 retrieves table definition information from a database data dictionary of production database 112. QMS 108 retrieves a "field name" of a table identified as a "Primary Key" from the database data dictionary. Using the "Primary Key" for the table and a value for the field specified by the code for the query provided by user 106, QMS 108 generates a "where clause." With respect to the foregoing example, QMS 108 determines that the Primary Key specifies "ID" and the value for the field specified by the code for the query is "9999," such that the "where" clause is "where ID=9999." Using the identified table name, QMS 108 prepares an internal temporary SELECT query using the table name and the generated "where clause." With respect to the foregoing example, the generated SELECT query would be "SELECT from Table-1 where ID=9999." QMS 108 executes the SELECT query to reads the existing values of the field(s) of the table matching the SELECT query into memory. QMS 108 generates an INSERT query and appends the current values of the records stored in memory to form a completed INSERT query. With respect to the foregoing example, the completed INSERT query would be "INSERT into Table-1 where ID=9999 [records obtained from execution of the 'SELECT from Table-1 where ID=9999' query]". Thus, as detailed above, where the query specified by the user is a DELETE query to delete a specific record, QMS 108 generates an INSERT query that contains the present values of the specified record such that the record may be restored after deletion. Thus, the completed INSERT query is the code of the rollback query that rolls back the DELETE query specified by the code for the query provided by user 106.

In another example, QMS 108 identifies the code for the query as an UPDATE type. QMS 108 may generate a rollback query that rolls back the UPDATE query specified by the code for the query provided by user 106 using a combination of the techniques for generating rollback code for the INSERT and DELETE queries described above. For example, where an UPDATE query changes a value to a field of an existing entry, QMS 108 may identify the table that includes the entry, the specific entry, the field, the previous value of the field, and the changed value of the field, and generate a rollback query to restore the previous value to the field of the entry.

The data in statistical data boxes 708 may indicate the number of queries involved in the query, the type of queries in the query, the number of records deleted by executing the query, and the number of records modified by executing the query.

Thus, in some examples, the code for a query (e.g., a query entered in query box 326) expresses an operation to be performed on production database 112 may be considered first code for the query and may express a first operation to be performed on production database 112. In such examples, the first operation may be configured to alter at least one record stored by production database 112 from a first state to a second state. Furthermore, in such examples, prior to outputting, for display to a second user, the code for the query for review by the second user, QMS 108 may process the first code to generate a second code for rolling back changes to the database caused by execution of the first code. The second code expresses a second operation to be performed on production database 112. The second operation is configured to cause production database 112 to revert the at least one record from the second state back to the first state.

Figure 8:
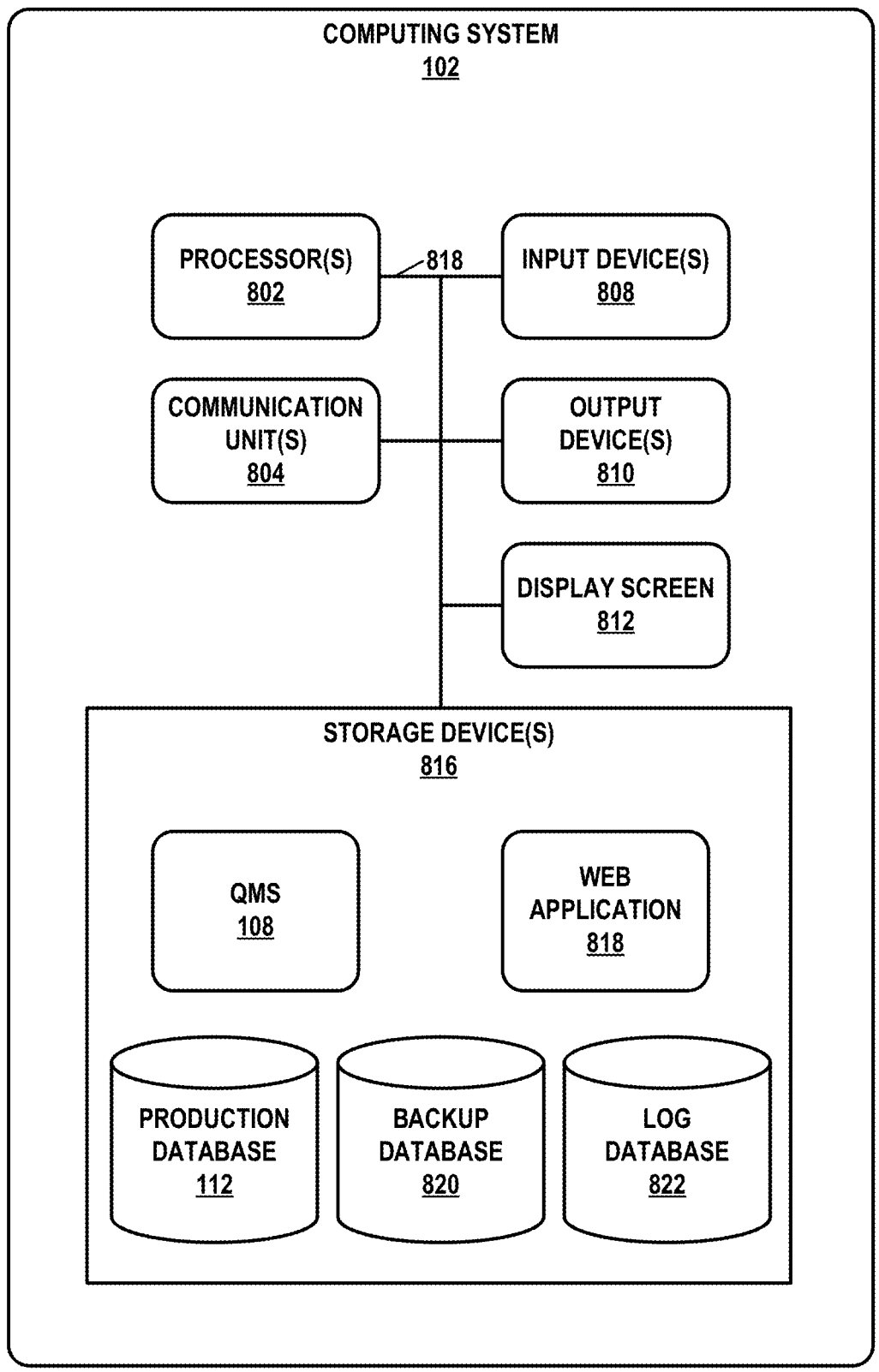
FIG. 8 is a block diagram illustrating example components of a computing system, in accordance with one or more techniques of this disclosure.

FIG. 8 is a block diagram illustrating example components of computing system 102, in accordance with one or more techniques of this disclosure. FIG. 8 illustrates only one particular example of computing system 102, and many other example configurations of computing system 102 exist and may implement techniques of this disclosure.

As shown in the example of FIG. 8, computing system 102 includes one or more processor(s) 802, one or more communication unit(s) 804, one or more input device(s) 808, one or more output device(s) 810, a display screen 812, one or more storage device(s) 816, and one or more communication channels 818. Computing system 102 may include other components. For example, computing system 102 may include physical buttons, microphones, speakers, communication ports, and so on. Communication channel(s) 818 may interconnect each of components 802, 804, 808, 810, 812, and 816 for inter-component communications (physically, communicatively, and/or operatively). In some examples, communication channel(s) 818 may include a system bus, a network connection, an inter-process communication data structure, or any other method for communicating data.

Storage device(s) 816 may store information required for use during operation of computing system 102. Storage system 110 (FIG. 1) may include storage device(s) 816. In some examples, one or more of storage device(s) 816 have the primary purpose of being a short term and not a long-term computer-readable storage medium. For instance, one or more of storage device(s) 816 may be volatile memory and may therefore not retain stored contents if powered off. One or more of storage device(s) 816 may further be configured for long-term storage of information as non-volatile memory space and retain information after power on/off cycles. In some examples, processor(s) 802 of computing system 102 read and may execute instructions stored by storage device(s) 816.

Computing system 102 may include one or more input device(s) 808 that computing system 102 uses to receive user input. Examples of user input include tactile, audio, and video user input. Input device(s) 808 may include presence-sensitive screens, touch-sensitive screens, mice, keyboards, voice responsive systems, microphones or other types of devices for detecting input from a human or machine.

Communication unit(s) 804 may enable computing system 102 to send data to and receive data from one or more other computing devices (e.g., via a communications network, such as a local area network or the Internet). For instance, communication unit(s) 804 may be configured to receive and receive data from user devices (e.g., user devices 104 (FIG. 1). In some examples, communication unit(s) 804 may include wireless transmitters and receivers that enable computing system 102 to communicate wirelessly with the other computing devices. Examples of communication unit(s) 304 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc.

Output device(s) 810 may generate output. Examples of output include tactile, audio, and video output. Output device(s) 810 may include presence-sensitive screens, sound cards, video graphics adapter cards, speakers, liquid crystal displays (LCD), or other types of devices for generating output.

Processor(s) 802 may be implemented in circuitry. Example types of processor(s) 802 may include microprocessors, application-specific integrated circuits, field-programmable gate arrays, and so on. Processor(s) 802 may read instructions from storage device(s) 816 and may execute instructions stored by storage device(s) 816. Execution of the instructions by processor(s) 802 may configure or cause computing system 102 to provide at least some of the functionality ascribed in this disclosure to computing system 102. As shown in the example of FIG. 8, storage device(s) 816 include computer-readable instructions associated with QMS 108. Additionally, in the example of FIG. 8, storage device(s) 816 may include computer-readable instructions associated with a web application 818. Execution of instructions stored in storage device(s) 816 may cause or configure processor(s) 802 to perform actions ascribed in this disclosure to software units, such as QMS 108 and web application 818. In the example of FIG. 8, QMS 108 may interact with web application 818 to provide user interfaces to and receive indications of user input from users. In other examples, QMS 108 may provide user interfaces to and receive indications of user input from users in other ways.

Furthermore, as shown in the example of FIG. 8, storage device(s) 816 may store production database 112, a backup database 820, and a log database 822. Backup database 820 may store a copy of some or all of production database 112. QMS 108 may use records in backup database 820 to restore data in production database 112 as part of executing rollback queries. In some examples, QMS 108 may store data to backup database when QMS 108 executes a query that modifies or deletes the data in production database 112. Thus, the code for rollback queries may read records from backup database 820 and store such records back into production database 112.

In some examples, after obtaining the code for a query to production database 112 and prior to outputting the code for the query for review by a second user, QMS 108 may store, in a log database 822, a record for the query comprising the code for the query. Additionally, after obtaining the indication that the second user approves the code for the query and prior to receiving the request to execute the query on the first database, QMS 108 may store data in log database 822 indicating that the second user approves the code for the query. After receiving the request to execute the query on the production database 112, QMS 108 may store data in log database 822 that indicates the request to execute the query. In this way, QMS 108 may be able to store data that may be used to audit the approval and execution processes of queries that are executed on production database 112. For instance, data in log database 822 may be used to determine how an improper query came to be executed on production database 112.

Additionally, in some examples, QMS 108 may store an indication that a first user is a user of the database, store an indication that a second user is a supervisor of the first user. QMS 108 may also store data indicating that the first user is allowed to submit code for one or more queries to production database 112. QMS 108 may also store data indicating that the second user is allowed to submit approval of the one or more codes for the one or more queries to the database. QMS 108 may store such data in storage device(s) 816. In this way, QMS 108 may store data defining roles and permissions for users. Defining such roles and permissions for users may help ensure that only appropriate users are able to submit and review queries.

In some examples, QMS 108 may be configured to work with multiple databases. For example, QMS 108 may work with a MySQL database and also work with an SQL Server database. QMS 108 may store data defining different roles and permissions for users for different databases. For instance, QMS 108 may store data indicating that a first user is allowed to submit queries for a first database and execute queries on the first database, but not a second database. In another example, QMS 108 may store data indicating that a second user is allowed to review queries for a second database but not a third database, and so on. In some examples, QMS 108 may store, for each database, data indicating which users have permission to submit queries for the database, which users have permission to review queries for the database, and which users have permission to execute queries on the database. QMS 108 may store such data in storage system 110 (FIG. 1) and hence, storage device(s) 816. QMS 108 may enforce these permissions as part of the submission-approval-execution workflow (e.g., as described with respect to FIG. 2). As part of enforcing the permissions, QMS 108 may require user authentication of users to establish identity before allowing a user to submit, approve, or execute a query.

In examples where QMS 108 works with multiple databases, there may be different applications associated with different ones of the databases. In other words, there may be a one-to-one mapping between applications and databases. During a setup process, applications may be registered with QMS 108. To register an application with QMS 108, QMS 108 may capture various types of information, such as a name of the application, a database type of the database corresponding to the application, and a database URL of the application corresponding to the application.

In some examples, QMS 108 may define users belonging to a particular role. QMS 108 may store data in storage system 110 (and hence, storage device(s) 816) data indicating roles for users. Example roles may include user, approver, administrator, and root. A user having the user role may be allowed to submit queries along with appropriate rollback queries for approval. A user having the user role may also be allowed to execute approved queries. A user having the approver role may approve or reject submitted queries. In some examples, a user having the approver role may be a subject matter expert (SME) or lead for an application. In some examples, a user having an approver role may not be allowed to approve a query submitted by the user himself/herself.

A user having an administrator role may be able to grant or revoke access to QMS 108 for users of particular applications. A user having the administrator role may be able to use QMS 108 to configure details of an application database of application software. A user having the administrator role may also be allowed to define roles of other users. In some examples, a user having the administrator role may be able to use audit data and/or purge old records. In some examples, there is only one user having an administrator role for each registered application or database. A user having the root role may be a super user of QMS 108. A user having the root role may set the user having the administrator role and register this user. In some examples, a user having the root role may access all requests to QMS 108. Furthermore, in some examples, only a user having the root role may be able to register an application. In some examples, a user having the root role may mark applications as being active or inactive.

Although this disclosure is described largely with reference to production databases, the techniques of this disclosure may be applicable to other types of databases.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
    obtaining, by processing circuitry of a computing device and from a first user, code for a query to a database, wherein the code for the query expresses an operation to be performed on the database in response to execution of the query;
    in response to receiving the code for the query, automatically performing, by the processing circuitry, an operation to determine a number of records of the database that would be accessed by executing the query on the database;
    outputting, by the processing circuitry and for display to the first user, the number of records of the database that would be accessed by executing the query on the database;
    outputting, by the processing circuitry and for display to the first user, a prompt for an acknowledgement by the first user of the number of records of the database that would be accessed;
    receiving, by the processing circuitry and from the first user, an indication of the acknowledgement by the first user of the number of records of the database that would be accessed;
    in response to receiving the code for the query and the indication of the acknowledgement by the first user of the number of records of the database that would be accessed, outputting, by the processing circuitry and for display to a second user, the code for the query for review by the second user;

after outputting the code for the query for review by the second user, obtaining, by the processing circuitry and from the second user, an indication that the second user approves the code for the query; and based on the indication that the second user approves the code for the query, executing, by the processing circuitry, the query on the database.

2. The method of claim 1, wherein the method further comprises:
prior to outputting, for display to the second user, the code for the query for review by the second user:
automatically validating, by the processing circuitry, a syntax of the code for the query; and
outputting, by the processing circuitry and for display to the first user, an indication of whether the syntax of the code for the query is valid.

3. The method of claim 1,
wherein the method further comprises after receiving the indication that the second user approves the code for the query, receiving, by the processing circuitry, a request to execute the query on the database; and
wherein executing the query on the database comprises:
based on the indication that the second user approves the code for the query and in response to receiving the request to execute the query, executing, by the processing circuitry, the query on the database.

4. The method of claim 3,
wherein the operation to determine the number of records of the database that would be accessed by executing the query on the database comprises a first operation to determine a first number of records of the database that would be accessed by executing the query on the database, and
wherein the method further comprises:
in response to receiving the request to execute the query and prior to executing the query on the database, automatically performing, by the processing circuitry, a second operation to determine a second number of records of the database that would be accessed by executing the query on the database; and
outputting, by the processing circuitry, the second number of records of the database that would be accessed by executing the query on the database.

5. The method of claim 4,
wherein the method further comprises:
prior to executing the query on the database:
determining that the second number of records of the database that would be accessed by executing the query on the database is different from the first number of records of the database that would be accessed by executing the query on the database;
outputting, by the processing circuitry, an indication that the second number of records is different from the first number of records and a prompt for an explanation of why the second number of records is different from the first number of records;
receiving, by the processing circuitry, data indicating the explanation of why the second number of records is different from the first number of records; and
storing, by the processing circuitry, the data indicating the explanation of why the second number of records is different from the first number of records, and
wherein in response to receiving the request to execute the query and based on the indication that the second user approves the code for the query, executing, by the processing circuitry, the query on the database comprises:
in response to receiving the request to execute the query and the data from the first user indicating the explanation of why the second number of records is different from the first number of records, and based on the indication that the second user approves the code for the query, executing, by the processing circuitry, the query on the database.

6. The method of claim 1,
wherein the code for the query that expresses the operation to be performed on the database comprises a first code for the query that expresses a first operation to be performed on the database, wherein the first operation is configured to alter at least one record stored by the database from a first state to a second state,
wherein the method further comprises:
prior to outputting, for display to the second user, the code for the query for review by the second user:
outputting, by the processing circuitry and to the first user, a prompt for a second query for rolling back changes to the database caused by execution of the first code, wherein the second query expresses a second operation to be performed on the database, and wherein the second operation is configured to revert the at least one record from the second state back to the first state; and
receiving, by the processing circuitry and from the first user, the second code for rolling back changes to the database caused by execution of the first code.

7. The method of claim 1,
wherein the code for the query that expresses the operation to be performed on the database comprises a first code for the query that expresses a first operation to be performed on the database, wherein the first operation is configured to alter at least one record stored by the database from a first state to a second state,
wherein the method further comprises:
prior to outputting, for display to the second user, the code for the query for review by the second user:
processing, by the processing circuitry, the first code to generate a second code, wherein the second code is for rolling back changes to the database caused by execution of the first code, wherein the second code expresses a second operation to be performed on the database, and wherein the second operation is configured to cause the database to revert the at least one record from the second state back to the first state.

8. The method of claim 1,
wherein the database comprises a first database, and
wherein the method further comprises:
after obtaining the code for the query to the first database and prior to outputting the code for the query for review by the second user, storing, by the processing circuitry and in a second database, a record for the query comprising the code for the query;
after obtaining the indication that the second user approves the code for the query and prior to receiving the request to execute the query on the first database, storing, by the processing circuitry, data in the second database that indicates that the second user approves the code for the query; and after receiving the request to execute the query on the first database, storing, by the processing circuitry, data in the second database that indicates the request to execute the query.

9. The method of claim 1, further comprising:
storing, by the processing circuitry, an indication that the first user is a user of the database;
storing, by the processing circuitry, an indication that the second user is a supervisor of the first user;
storing, by the processing circuitry, data indicating that the first user is allowed to submit one or more codes for one or more queries to the database; and
storing, by the processing circuitry, data indicating that the second user is allowed to submit approval of the one or more codes for the one or more queries to the database.

10. The method of claim 1, the first user is disallowed from submitting approval of one or more queries to the database that the same first user submitted.

11. The method of claim 1, wherein receiving the request to execute the query on the database comprises receiving, from the first user, the request to execute the query on the database.

12. A computing system comprising processing circuitry and a storage system, the processing circuitry configured to:
obtain, from a first user, code for a query to a database stored in the storage system, wherein the code for the query expresses an operation to be performed on the database;
in response to receiving the code for the query, automatically perform an operation to determine a number of records of the database that would be accessed by executing the query on the database;
output, for display to the first user, the number of records of the database that would be accessed by executing the query on the database;
output, for display to the first user, a prompt for an acknowledgement by the first user of the number of records of the database that would be accessed;
receive, from the first user, an indication of the acknowledgement by the first user of the number of records of the database that would be accessed;
in response to receiving the code for the query and the indication of the acknowledgement by the first user of the number of records of the database that would be accessed, output, for display to a second user, the code for the query for review by the second user;
after outputting the code for the query for review by the second user, obtain, from the second user, an indication that the second user approves the code for the query; and
based on the indication that the second user approves the code for the query, execute the query on the database.

13. The computing system of claim 12, wherein the processing circuitry is configured to:
prior to outputting, for display to the second user, the code for the query for review by the second user:
automatically validate a syntax of the code for the query; and
output, for display to the first user, an indication of whether the syntax of the code for the query is valid.

14. The computing system of claim 13,
wherein the processing circuits are further configured to receive, after receiving the indication that the second user approves the code for the query, a request to execute the query on the database; and wherein the processing circuits are configured to execute, based on the indication that the second user approves the code for the query and in response to receiving the request to execute the query, the query on the database.

15. The computing system of claim 14,
wherein the operation to determine the number of records of the database that would be accessed by executing the query on the database comprises a first operation to determine a first number of records of the database that would be accessed by executing the query on the database, and
wherein the processing circuitry is further configured to:
in response to receiving the request to execute the query and prior to executing the query on the database, automatically perform a second operation to determine a second number of records of the database that would be accessed by executing the query on the database; and
output the second number of records of the database that would be accessed by executing the query on the database.

16. The computing system of claim 15,
wherein the processing circuitry is further configured to:
prior to executing the query on the database:
determine that the second number of records of the database that would be accessed by executing the query on the database is different from the first number of records of the database that would be accessed by executing the query on the database;
output an indication that the second number of records is different from the first number of records and a prompt for an explanation of why the second number of records is different from the first number of records;
receive data indicating the explanation of why the second number of records is different from the first number of records;
store, in the storage system, the data indicating the explanation of why the second number of records is different from the first number of records; and
in response to receiving the request to execute the query and the data from the first user indicating the explanation of why the second number of records is different from the first number of records, and based on the indication that the second user approves the code for the query, execute the query on the database.

17. The computing system of claim 12,
wherein the code for the query that expresses the operation to be performed on the database comprises first code for the query that expresses a first operation to be performed on the database, wherein the first operation is configured to alter at least one record stored by the database from a first state to a second state,
wherein the processing circuitry is further configured to:
prior to outputting, for display to the second user, the code for the query for review by the second user:
output, to the first user, a prompt for second query for rolling back changes to the database caused by execution of the first code, wherein the second query expresses a second operation to be performed on the database, and wherein the second operation is configured to revert the at least one record from the second state back to the first state; and receive, from the first user, the second code for rolling back changes to the database caused by execution of the first code.

18. The computing system of claim 12,
wherein the code for the query that expresses the operation to be performed on the database comprises first code for the query that expresses a first operation to be performed on the database, wherein the first operation is configured to alter at least one record stored by the database from a first state to a second state,
wherein the processing circuitry is further configured to:
 prior to outputting, for display to the second user, the code for the query for review by the second user:
  process the first code to generate a second code for rolling back changes to the database caused by execution of the first code, wherein the second code expresses a second operation to be performed on the database, and wherein the second operation is configured to cause the database to revert the at least one record from the second state back to the first state.

19. The computing system of claim 12,
wherein the database comprises a first database, and
wherein the processing circuitry is further configured to:
 after obtaining the code for the query to the first database and prior to outputting the code for the query for review by the second user, store, in a second database, a record for the query comprising the code for the query;
 after obtaining the indication that the second user approves the code for the query and prior to receiving the request to execute the query on the first database, store data in the second database that indicates that the second user approves the code for the query; and
 after receiving the request to execute the query on the first database, store data in the second database that indicates the request to execute the query.

20. The computing system of claim 12, wherein the processing circuitry is further configured to:
 store, in the storage system, an indication that the first user is a user of the database;
 store, in the storage system, an indication that the second user is a supervisor of the first user;
 store, in the storage system, data indicating that the first user is allowed to submit one or more codes for one or more queries to the database; and
 store, in the storage system, data indicating that the second user is allowed to submit approval of the one or more codes for the one or more queries to the database.

21. The computing system of claim 12, the first user is disallowed from submitting approval of one or more queries to the database that the same first user submitted.

22. A non-transitory, computer-readable medium comprising instructions that, when executed, are configured to cause processing circuitry of a computing device to:
 obtain, from a first user, code for a query to a database, wherein the code for the query expresses an operation to be performed on the database;
 in response to receiving the code for the query, automatically perform an operation to determine a number of records of the database that would be accessed by executing the query on the database;
 output, for display to the first user, the number of records of the database that would be accessed by executing the query on the database;
 output, for display to the first user, a prompt for an acknowledgement by the first user of the number of records of the database that would be accessed;
 receive, from the first user, an indication of the acknowledgement by the first user of the number of records of the database that would be accessed;
 in response to receiving the code for the query and the indication of the acknowledgement by the first user of the number of records of the database that would be accessed, output, for display to a second user, the code for the query for review by the second user;
 after outputting the code for the query for review by the second user, obtain, from the second user, an indication that the second user approves the code for the query; and
 based on the indication that the second user approves the code for the query, execute the query on the database.

* * * * *